United States Patent [19]

Catlin et al.

[11] 4,198,221
[45] Apr. 15, 1980

[54] PARTICLE-IN-GAS FILTERING

[75] Inventors: Jack R. Catlin, Gosforth; Robert E. Strong, Bootle; William R. Guest, Holmrook, all of England

[73] Assignee: British Nuclear Fuels Limited, Warrington, England

[21] Appl. No.: 888,289

[22] Filed: Mar. 20, 1978

[30] Foreign Application Priority Data

Apr. 21, 1977 [GB] United Kingdom ............... 16646/77

[51] Int. Cl.² ............................................. B01D 46/00
[52] U.S. Cl. ....................................... 55/481; 55/484; 55/502; 55/DIG. 9
[58] Field of Search ............... 55/96, 350, 97, 478, 55/479–481, 490, 500, 502, 493, 521, DIG. 9; 210/493

[56] References Cited

U.S. PATENT DOCUMENTS

| 1,990,110 | 2/1935 | Bridges | 55/481 |
| 2,145,683 | 1/1939 | Bostock | 55/478 |
| 3,383,841 | 5/1968 | Olson et al. | 55/481 |
| 3,402,530 | 9/1968 | Agnor | 55/484 |
| 3,690,045 | 9/1972 | Neumann | 55/350 |
| 3,755,095 | 9/1973 | Stickel | 55/481 |
| 3,823,532 | 7/1974 | Cooper et al. | 55/481 |
| 4,023,944 | 5/1977 | Beane | 55/481 |

FOREIGN PATENT DOCUMENTS

| 861301 | 1/1971 | Canada | 55/481 |
| 1094206 | 12/1960 | Fed. Rep. of Germany | 55/481 |
| 1303302 | 4/1971 | United Kingdom | 55/481 |
| 1318773 | 5/1973 | United Kingdom | 55/481 |

Primary Examiner—Bernard Nozick
Attorney, Agent, or Firm—Larson, Taylor and Hinds

[57] ABSTRACT

In a filter assembly for particle-in-gas filtration, filter units are supported on a horizontal partition in the filtering position and are raised from the partition and moved horizontally to enable the filter units to be replaced. The invention may be used in nuclear installations.

6 Claims, 3 Drawing Figures

PARTICLE-IN-GAS FILTERING

BACKGROUND OF THE INVENTION

This invention relates to particle-in-gas filtration and particularly relates to changing ventilation filters in hazardous, toxic or radioactive environments. In such environments it is necessary to remove particulate matter from the atmosphere and to minimise redispersion of such particulate matter during the replacement of the filters. It is particularly important in nuclear installations that particulate radioactive material is removed from the atmosphere of the installation and is not redispersed so as to protect the operators of the plant from exposure to radioactivity.

SUMMARY OF THE INVENTION

According to the present invention a filter assembly for particle-in-gas filtration comprises an enclosure divided into inlet and outlet chambers by a horizontal partition, the horizontal partition having one or more apertures communicating between the inlet and outlet chambers, one or more filter units which are adapted to be located in a filtering position on the partition in such a way that gas passing from the inlet chamber to the outlet chamber passes through the filter units, means for moving the one or more filter units vertically from said filtering position to a second position in which the one or more filter units are displaced from the partition and means for moving the one or more filter units horizontally when they are in the second position.

Conveniently the one or more filter units have outwardly extending flanges along opposite sides thereof and the means for moving the one or more filter units vertically from the filtering position to the second position comprise supporting members which are movable between a lower position in which the supporting member rests below the flanges of the filter units when the filter units are in the filtering position and an upper position in which the one or more filter units are suspended from the supporting members by the flanges the one or more filter units being in their second position when the supporting members are in the upper position. With the filter units in the second position replacement filter units may be slid horizontally along the supporting members from one end of the supporting members to displace used filters from the other end of supporting members. The filter units may be moved by a ram. Means may be provided to permit replacement filters to be introduced into the enclosure and used filters to be removed from the enclosure in such a way that there is no egress of the atmosphere from the enclosure to the environment.

A second aspect of the present invention provides a method of changing filter units in a filter assembly as described above comprising the steps of moving the one or more filter units vertically from said filtering position to the second position in which the one or more filter units are displaced from the partition, introducing a further filter unit into one end of the enclosure, moving the further filter unit horizontally towards the other end of the enclosure to cause any other filter units present to be pushed horizontally by the further filter unit towards the other end of the enclosure, removing a filter unit from the other end of the enclosure, and lowering the filter units remaining within the enclosure into contact with the partition so that gas passing from the inlet chamber to the outlet chamber passes through the filter units.

DESCRIPTION OF THE DRAWINGS

The invention will be illustrated by the following description of a filter assembly for use in ventilation filtration. The description is given by way of example only and has reference to the accompanying drawings wherein.

DESCRIPTION OF THE PREFERRED EMBODIMENTS

Figure 1:
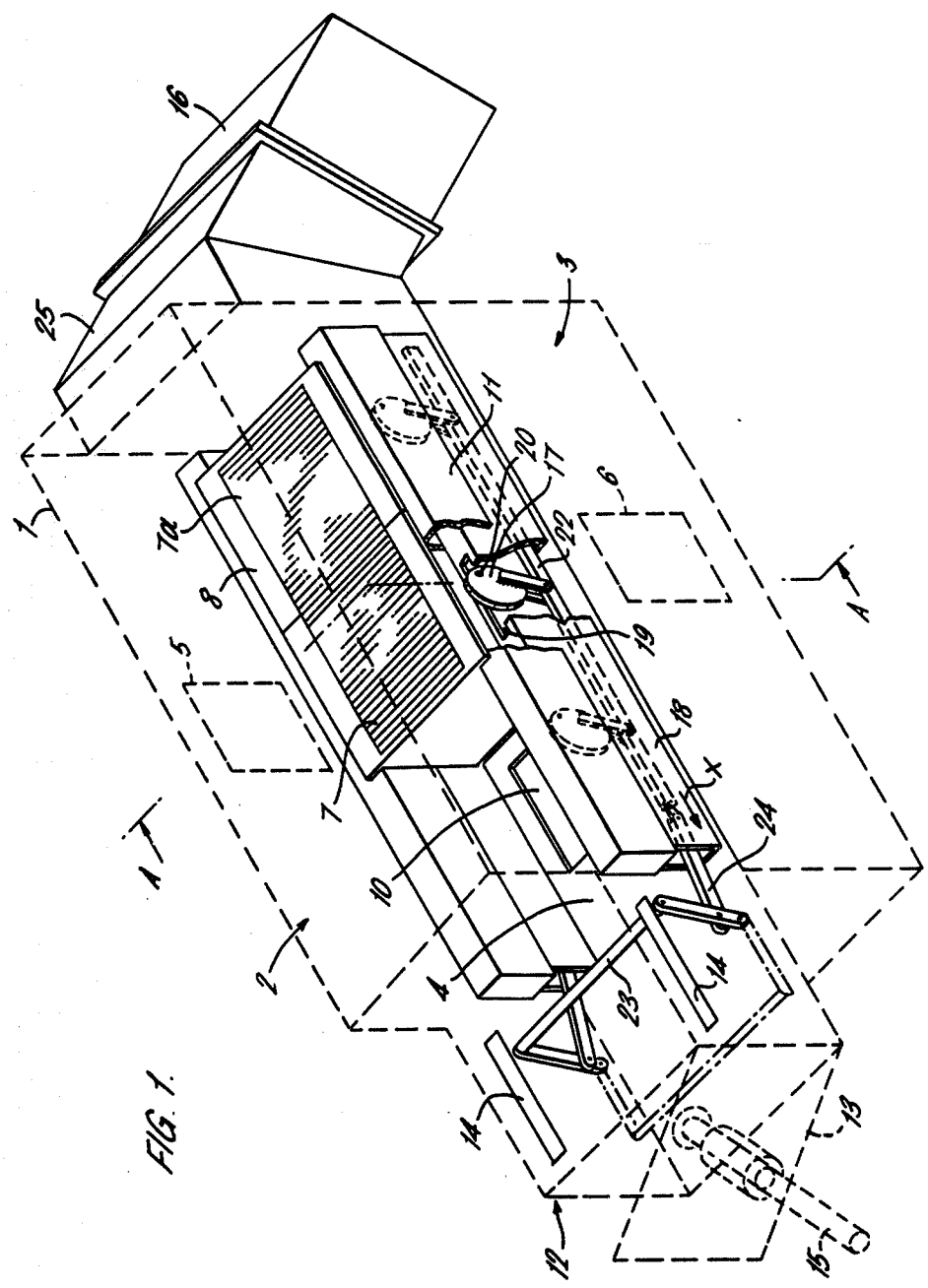
FIG. 1 is a diagrammatic fragmentary isometric view of a filter assembly.
Figure 2:
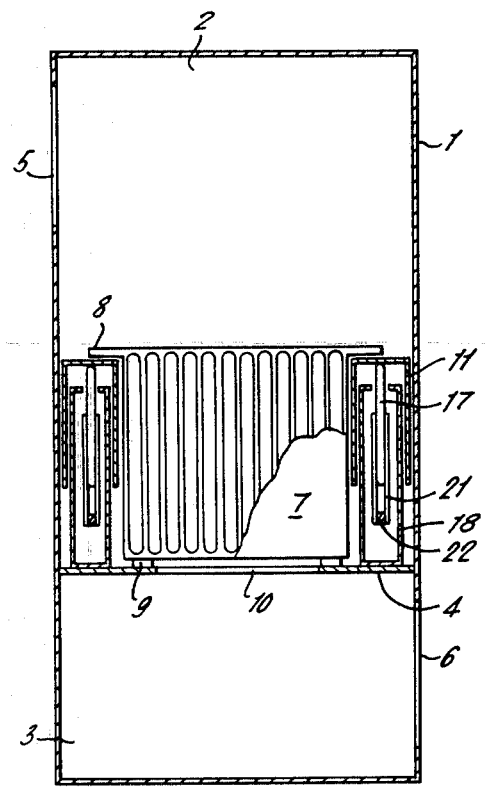
FIG. 2 is a diagrammatic cross-sectional view along the line A—A of FIG. 1 showing the filter assembly in a position for use.

Referring to FIG. 1 the filter assembly has an enclosure 1 (indicated generally by the dotted lines) divided into upper and lower chambers 2, 3 by a horizontal partition 4. The upper chamber 2 has an inlet port 5 through which air to be filtered enters the upper chamber 2 and the lower chamber 3 has an outlet port 6 through which the filtered air leaves the filter assembly. The assembly receives three filter units 7 (one of which has been omitted from FIG. 1 so that the construction of the assembly can be seen more clearly). Adjacent filter units within the assembly are in abutment. Each filter unit 7 has an outer casing containing a continuous strip of glass fibre paper folded and fitted within the casing so as to provide vertically arranged layers of the paper which acts as the filter element. The arrangement is shown schematically in FIG. 2. Along two opposite edges of each filter unit 7 is an outwardly extending flange 8 and around the base of each filter unit is a peripheral seal 9. The filter unit 7 is open at the top and bottom to permit air to flow through the unit 7.

Figure 3:
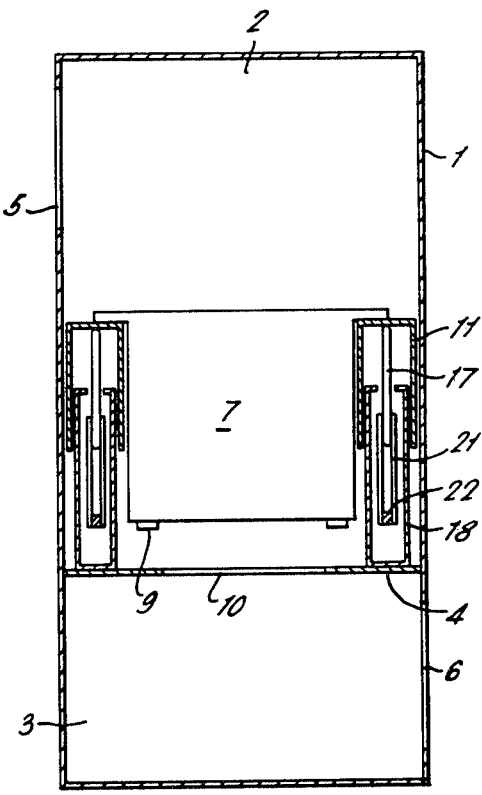
FIG. 3 is a diagrammatic cross-section view similar to FIG. 2 but showing the filter assembly in a position in which the filter units may be changed.

The flanges 8 on each filter units within the filter assembly are engagable with rails 11 which are vertically movable between a lower position (FIG. 2) where the flanges 8 are above and spaced from the rails 11 and the filter unit rests on the seal 9 on the partition 4 and an upper position (FIG. 3) in which the seal 9 is displaced from the partition 4 and the filter unit 7 is suspended from the rail 11 by the flanges 8.

When the filter assembly is in use to filter air passing through it (illustrated in FIG. 2) the rail 11 is in its lower position, and the filter units 7 stand on the partition 4 over apertures 10 which penetrate the partition 4. The peripheral seal 9 is compressed by the weight of the filter and prevents the passage of air between the filter unit 7 and the partition 4. The enclosure 1 is thus divided into two chambers 2, 3 which are in communication only through the filter units 7.

When the rails 11 are in the upper position (FIG. 3) the filter unit is suspended from the rails 11 and the seal 9 is free of the partition 4. The filter units are therefore free to slide along the rails 11. If it is desired to change one or all of the filter units 7 in the filter assembly, replacement filter units are introduced one at a time into the enclosure 1 through an access chamber 12 having an outer door 13 and are suspended from flanges 14 within the chamber 12 at the same height as the rails 11 in their upper position. The outer door 13 is then closed and a push ram 15 passing through the outer door 13 used to move the replacement filter unit from the access chamber to a position within the enclosure 1 in which the replacement filter unit is above the first of the apertures 10 through the partition 4. As the replacement filter unit is pushed into the enclosure the filter unit 7a at the opposite end of the rail is pushed out of the enclosure and is collected in a container 16. If only one filter is to be replaced the rails 11 are then moved to its lower position so that each of the filter units 7 rests on its seal 9 on the partition 4 and is ready to continue its filtering action.

If more than one filter unit is to be replaced the procedure outlined above is repeated the required number of times until all the filter units requiring replacement have been ejected from the enclosure 1 and the rails 11 are then lowered.

The filter assembly can be made to receive more than three filter units 7 if required and more than one enclosure 1 may be used in an installation. Conveniently in installations having two or more enclosures the air flow through an enclosure is cut off whilst the filter changing operation described above is performed in that enclosure. Preferably the interior of the enclosure is kept under depression during the filter change operation so that any leakage is into the filter assembly.

There are many ways in which the rails 11 can be moved from their lower to their upper position. By way of example the particular method illustrated in FIGS. 1 to 3 will be described in detail. The rails 11 are supported by cam-members 17 eccentrically pivoted within a tubular beam 18 having slots 19 in its upper surface through which the cam members 17 protrude to contact the underside of the rails 11. The cam members 17 are caused to pivot around their pivot points 20 by connecting arms 21 pivotally mounted to both the cam-members 17 and operating rods 22. As the operating rods 22 are moved in the direction shown by the arrow X in FIG. 1, the cam members 17 rotate and cause the rails 11 to rise to their upper positions. The operating rods 22 are pivotally linked to the side limbs of an inverted U-shaped handle 23 pivotally mounted on the walls of the access chamber 12. As the handle 23 is moved from the position shown in full lines in FIG. 1 to the position shown by the chained dotted lines the pivoted link 24 causes the operating rod 22 to move in the direction of the arrow X thus causing the rails 11 to rise.

Other ways of raising and lowering the rails 11 include hydraulic or compressed air operated rams under the rails 11, screw-jack devices or bell-crank devices.

The filter assemblies described herein find particular application in nuclear installations where the atmosphere has to be filtered to remove air-borne radioactive particles. In such installations it is essential that there is no egress of the atmosphere within the enclosure to the surrounding area. Therefore the enclosure 1 illustrated in FIG. 1 may be modified by the inclusion of an inner door (not shown) at each end of the enclosure which is only opened when the outer door 13 is closed or when there is a container 16 connected to the filter-removing end of the enclosure 1. When the filter assembly is in use to filter particles from gas passing through it the inner doors should preferably be closed.

In a nuclear installation it may be necessary to replace filter units before their efficiency as filters has become impaired because of the accumulation of radioactive material on them. The radioactivity of the filter units is monitored to determine when replacements are required. When a filter unit holding radioactive particles is removed from the enclosure exposure to the atmosphere should be avoided if possible. One method of achieving this is to surround the container 16 with a bag of plastics material such as polyvinylchloride and to attach the open end of the bag to a duct 25 connecting the enclosure 1 with the container 16. When the filter has been placed in the container the container is moved a short distance away from the duct and the bag closed by a heat seal so that the filter unit and the container are sealed inside the bag. Although the treatment of filter units containing radioactive particles has been described this method can be used for filter units containing other hazardous or toxic particulate material.

The useful life of filter units in a filter assembly may be extended by the use of a pre-filter for larger particles before the filter units. Such a pre-filter may be provided by using two filter assemblies similar to those described herein where one contains filter units having a coarser filter mesh size and is used in series with the other filter assembly which has filter units with a smaller filter mesh size. Alternatively the enclosure 1 may be adapted to contain a second set of abutting coarse filter units above the filter units 7 in FIGS. 1, 2 and 3, said second set having means similar to those described above for replacing one or more of the filter units when required. The filter units in the second set may be similar in construction to the filter units 7 or may be different from them. Preferably the filter units in the second set are adapted to act also as spark arresters.

Because the filter units in the filter assemblies described herein abut, the area within the enclosure not used for filtration is minimised. The method of changing the filter units may be operated remotely and can be adapted so that there is no egress of the atmosphere within the enclosure into the area surrounding the enclosure thus reducing the risk of exposure of the operators to the atmosphere within the enclosure.

We claim:
1. A filter assembly for particle-in-gas filtration comprising:
   a filtering enclosure,
   a horizontal partition dividing the enclosures into an inlet chamber and an outlet chamber and having apertures communicating between the inlet chamber and the outlet chamber,
   an inlet leading into the inlet chamber,
   an outlet leading from the outlet chamber, filter units each having a frame and outwardly extending flanges along two opposite sides thereof, said filter units being adapted to be located on the partition in a filtering position such that gas passing from the inlet chamber to the outlet chamber passes through the filter units before passing through said apertures, and being adapted to be moved vertically to a second position in which the filter units are displaced from the partition,
   means for moving the filter units vertically from the filtering position to the second position comprising opposed supporting members located within the enclosure above the partition, said supporting members being movable between a lower position in which the supporting member rests below the flanges of the filter units when the filter units are in the filtering position and an upper position in which the filter units are lifted from the partition and are suspended from the supporting members by the flanges, the filter units being in their second position when the supporting members are in the upper position, means located in said inlet chamber for moving said filter units upwardly to said second position and downwardly to said filtering position, a horizontal second inlet communicating with said inlet chamber and a horizontal second outlet communicating with said outlet chamber means for moving the filter units horizontally along the supporting members when the filter units are in the second position from said horizontal second inlet toward said horizontal second outlet.

2. A filter assembly as claimed in claim 1 wherein the supporting member is an inverted U-shaped rail which is moved from the lower position to the upper position by eccentrically mounted cam members.

3. A filter assembly as claimed in claim 1 wherein the means for moving the filter units horizontally comprise a ram extending from one end of the enclosure which contacts the filter unit nearest to that one end of the enclosure and slides it horizontally along the supporting members towards the other end of the enclosure thus causing any other filter units present to slide along the supporting members towards said other end.

4. A filter assembly as claimed in claim 1 wherein means are provided to introduce a filter unit into said one end of the enclosure in such a position that the means for moving the filter units horizontally can move the incoming filter unit into contact with the supporting members when the supporting members are in the upper position and means are provided at the other end of the enclosure to remove filter units which have been ejected from the other end of the supporting members.

5. A filter assembly as claimed in claim 4 wherein the means for introducing a filter unit into the enclosure include an inner door and an outer door defining a space there-between to receive a filter unit in the position where the means for moving the filter units horizontally can move the incoming filter unit into contact with the supporting members, the inner door only being opened when the outer door is closed and the outer door only being opened when the inner door is closed to minimise egress of the atmosphere within the enclosure to the environment.

6. A filter assembly as claimed in claim 4 wherein the means for removing filter units from the other end of the enclosure comprise a door opening from the enclosure and a container which fits over the door to receive the ejected filter unit, the door only being opened when the container is in position to receive the ejected filter.

* * * * *